United States Patent
Inaba et al.

(10) Patent No.: US 6,981,648 B1
(45) Date of Patent: Jan. 3, 2006

(54) INFORMATION CARRIER MEDIUM AND READER FOR READING THE INFORMATION CARRIER MEDIUM

(75) Inventors: Humio Inaba, Sendai (JP); Balasigamani Devaraj, Yamagata (JP); Masashi Usa, Miyagi (JP)

(73) Assignee: Natec Incorporated, Osaka (JP)

( * ) Notice: Subject to any disclaimer, the term of this patent is extended or adjusted under 35 U.S.C. 154(b) by 0 days.

(21) Appl. No.: 09/914,192

(22) PCT Filed: Jun. 9, 1999

(86) PCT No.: PCT/JP99/03084

§ 371 (c)(1),
(2), (4) Date: Oct. 31, 2001

(87) PCT Pub. No.: WO00/51071

PCT Pub. Date: Aug. 31, 2000

(30) Foreign Application Priority Data

Feb. 25, 1999 (JP) .................................. 11/47995

(51) Int. Cl.
G06K 19/02 (2006.01)

(52) U.S. Cl. ................ 235/488; 235/487; 235/168; 235/462.01; 235/462.14; 235/494

(58) Field of Classification Search ................ 235/488, 235/487, 468, 462.01, 462.14, 494; 283/91
See application file for complete search history.

(56) References Cited

U.S. PATENT DOCUMENTS

| | | | | |
|---|---|---|---|---|
| 4,044,231 A | * | 8/1977 | Beck et al. | 235/488 |
| 4,096,992 A | * | 6/1978 | Nojiri et al. | 235/462.18 |
| 4,359,633 A | * | 11/1982 | Bianco | 235/468 |
| 4,538,059 A | * | 8/1985 | Rudland | 283/82 |
| 4,863,169 A | * | 9/1989 | Miyazaki | 235/468 |
| 4,942,107 A | * | 7/1990 | Saeki et al. | 430/138 |
| 5,198,646 A | * | 3/1993 | Kunimoto | 235/449 |
| 5,270,526 A | * | 12/1993 | Yoshihara | 235/487 |
| 5,522,623 A | * | 6/1996 | Soules et al. | 283/91 |
| 5,525,798 A | | 6/1996 | Berson et al. | |
| 5,907,149 A | * | 5/1999 | Marckini | 235/487 |
| 5,971,276 A | * | 10/1999 | Sano et al. | 235/462.01 |
| 6,097,025 A | * | 8/2000 | Modlin et al. | 250/227.22 |
| 6,138,913 A | * | 10/2000 | Cyr et al. | 235/468 |
| 6,354,502 B1 | * | 3/2002 | Hagstrom et al. | 235/462.04 |

FOREIGN PATENT DOCUMENTS

| | | |
|---|---|---|
| EP | A1681012 | 11/1995 |
| EP | A2789316 | 8/1997 |
| JP | 60-5558 | 1/1985 |
| JP | 3-290780 | 12/1991 |
| JP | 6-176219 | 6/1994 |
| WO | WO85/02927 | 7/1985 |

\* cited by examiner

*Primary Examiner*—Steven S. Paik
(74) *Attorney, Agent, or Firm*—Birch, Stewart, Kolasch & Birch, LLP

(57) ABSTRACT

An information carrier medium includes at least first and second sheet members (12, 14) each having first and second surfaces opposite to each other and laminated together with the first surface of the first sheet member bonded to the first surface of the second sheet member. A security indicium (14; 71) is formed on at least one of the first surfaces of the respective first and second sheet members (12, 14). The security indicium is made of at least one inking material of a kind capable of responding to a coherent light when irradiated thereby. An electro-optical reader for reading the security indicium (14; 71) is also disclosed.

20 Claims, 5 Drawing Sheets

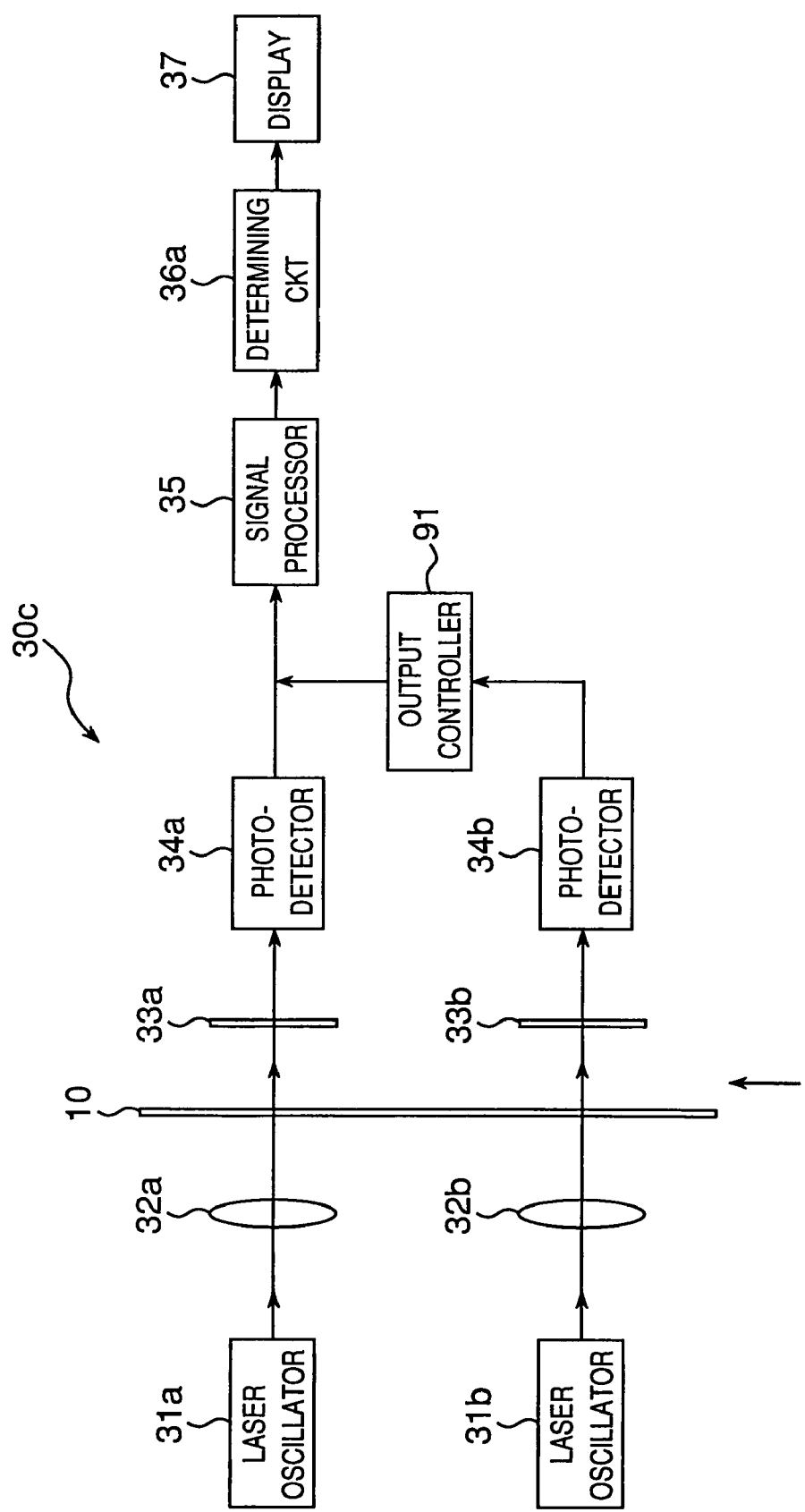

INFORMATION CARRIER MEDIUM AND READER FOR READING THE INFORMATION CARRIER MEDIUM

This application is the national phase under 35 U.S.C. § 371 of PCT International Application No. PCT/JP99/03084 which has an International filing date of Jun. 9, 1999, which designated the United States of America and was published in English.

TECHNICAL FIELD

The present invention generally relates to verification of the authenticity of the information carrier medium such as, for example, an ID card, a card key, a bank deposit card, a credit card or any other documented material that requires security, to determine if the user of the information carrier medium is an authorized person or if the information carrier medium is genuine. More particularly, the present invention relates to security indicia in the information carrier medium and a reader apparatus for reading the security indicia to verify the authenticity of the information carrier medium.

BACKGROUND ART

The use of security cards is now wide-spreading, accompanying an increase of types of the security cards. The security cards now in use includes, for example, ID cards, card keys, cash cards, bank deposit cards, membership cards, credit cards, pre-paid cards, telephone cards and so on. Those security cards generally make use of a data storage medium in the form of an IC chip, a length of magnetic recording tape or the like. As compared with cashes or any other valuable personal possession, the security card is relatively safe and convenient for a person to carry and use, however, the recent social problem is an increase of forgery and/or unauthorized use of the security cards.

To prevent the security card from being forged, various approaches have been employed. Most of the approaches include visual verification of the security card with naked eyes and electronic or magnetic verification of security data electronically or magnetically recorded on the security card. For the visual verification, the security card has visually readable data affixed to or printed on one surface thereof. The visually readable data includes a uniquely imaged hologram, a unique rainbow pattern, a micro-printed indicium, metamerism-based hidden characters and an opal-coloring.

On the other hand, for the electronic or magnetic verification, the security card a security data storage medium permanently affixed thereto, embedded therein, or printed thereon, and the security data stored in the storage medium and unique to the particular security card can be read and verified by the use of a corresponding electronic or magnetic reader apparatus. Examples of the security data storage medium include a pattern of punched hole, a length of magnetic recording tape or coating, a magnetic bar code, an azimuth recording, and a group of magnetic stripes.

While the various approaches to prevent the security card from being forged have been implemented, forgery experts are getting dexterous. One of the reasons therefor appears to be that they are good at analyzing the card reader to steal the structural details of the security card so that the security card can be forged based on the analyzed structural details.

With the advent of the age of wide-spreading cards, demands have been made for the security cards and the associated card reader that can hardly be forged or copied and that are less costly while securing a high level security.

DISCLOSURE OF INVENTION

The present invention has been devised with a view to providing an inexpensive security indicium that is difficult to be forged or altered while ensuring a high level security.

Another important object of the present invention is to provide an improved reading apparatus of a type operable with the valuables bearing the security indicium of the kind referred to above.

In order to accomplish these objects of the present invention, there is provided an information carrier medium includes at least first and second sheet members each having first and second surfaces opposite to each other and laminated together with the first surface of the first sheet member bonded to the first surface of the second sheet member. A security indicium is formed on at least one of the first surfaces of the respective first and second sheet members. The security indicium is made of at least one inking material of a kind capable of responding to a coherent light when irradiated thereby.

Preferably, the inking material is of a kind capable of absorbing the coherent light, emitting light when irradiated by the coherent light, or scattering light when irradiated by the coherent light.

Also preferably, the security indicium formed on such one of the first surfaces of the respective first and second sheet members is invisible to naked eyes in order to secure a high level of security effective to prevent any possible forgery of the information carrier medium.

According to another aspect of the present invention, there is provided an electro-optical reader for reading an information carrier medium of the kind described above, which comprises a source of projecting the coherent light towards the information carrier medium to illuminate a portion of the information carrier medium in register with the security indicium, a photo-detector means for detecting rays of light obtained from that portion of the information carrier medium, and a determining means connected with the photo-detector for comparing an output from the photo-detector with a reference signal stored therein to verify an authenticity of the information carrier medium.

Preferably, where the security indicium is made of two inking materials capable of responding to different wavelengths of light, respectively, the photo-detector means may comprise first and second photo-detectors for detecting the different wavelengths of light.

BRIEF DESCRIPTION OF DRAWINGS

The present invention will become readily understood from the following description of preferred embodiments thereof made with reference to the accompanying drawings, in which like parts are designated by like reference numeral and in which:

FIG. 9 is a block diagram showing the card reader according to the fourth preferred embodiment of the present invention.

BEST MODE FOR CARRYING OUT THE INVENTION

While the present invention will be described as applied to a credit card, the present invention can be effectively applied to any type of information carrier medium other than the credit card, regardless of the shape and/or the purpose for which it is used, provided that the information carrier medium bears at least one unique security indicium that is invisible to the naked eyes.

Figure 1A:
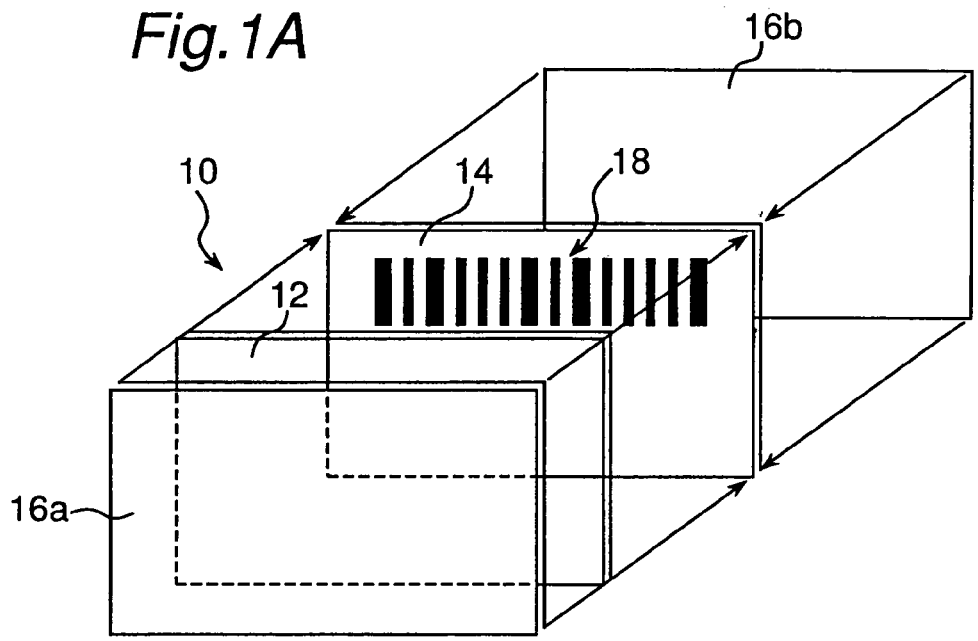
FIG. 1A is a schematic exploded view of a credit card which can be employed in the practice of the present invention.
Figure 1B:
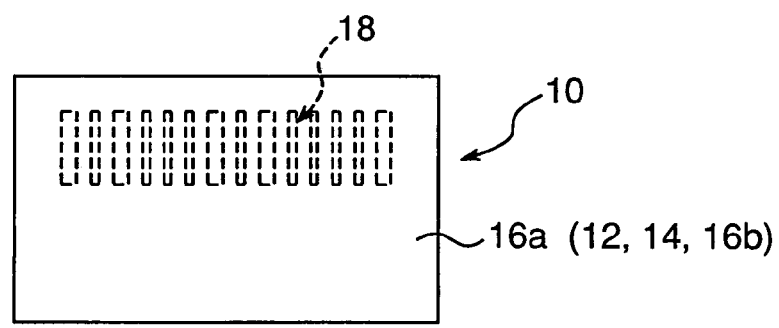
FIG. 1B is a schematic front elevational view of the credit card shown in FIG. 1A.
Figure 2:
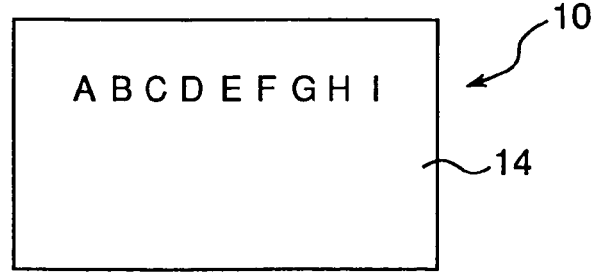
FIG. 2 is a view similar to FIG. 1B, showing a modified form of the credit card.

Referring first to FIGS. 1A and 1B, the credit card generally identified by 10 is shown comprising a laminate of a plurality of, for example, two generally oblong cover and carrier plates 12 and 14 of an equal size. The laminate is shown to have front and rear overlay films 16a and 16b bonded or otherwise secured in any suitable method to respective outer surfaces of the oblong plates 12 and 14. The illustrated credit card 10 also comprises a unique security indicium 18 formed or otherwise printed on a surface of one of the oblong cover and carrier plates, for example, the carrier plate 14, which is bonded to the cover plate 12. The unique security indicium 18 in the illustrated embodiment is in the form of a bar code made up of spaced bars, black-colored in FIG. 1A, of varying widths.

Each of those oblong plates 12 and 14 is made of any known synthetic resin such as, for example, hard polyvinyl chloride resin, PET resin, PET-G resin, ABS resin, polycarbonate resin or any other resin generally used in the manufacture of credit cards or the like. However, in the practice of the present invention, for ensuring a high level security substantially sufficient to make it impossible, or extremely difficult if not at all, to forge the credit card 10, the unique security indicium 18 on the surface of the carrier plate 14 adjacent the cover plate 12 is preferably invisible to the naked eyes so that nobody other than those who are associated with issuance of the credit card 10 can perceive the presence of the unique security indicium 18 in the credit card 10. For this purpose, the oblong plates 12 and 14 are preferably made of an opaque synthetic resin containing, for example, a polyvinyl chloride copolymer as a principal component. The front and rear overlay films 16a and 16b may also be made of the same material as or a synthetic resin different from the oblong plates 12 and 14.

However, if the front and rear overlay films 16a and 16b are both made an opaque synthetic resin such as an opaque polyvinyl chloride sheet, the oblong plates 12 and 14 may be made of a transparent synthetic resin containing, for example, a polyvinyl chloride copolymer. Alternatively, a combination is possible to use the opaque material for the cover plate 12 and the rear overlay film 16b and the transparent material for the front overlay film 16a and the carrier plate 14 or to use the opaque material for the front overlay film 16a and the cover plate 12 and the transparent material for the cover plate 12 and the rear overlay film 16b.

The security indicium 18 on the carrier plate 14 is preferably printed on that surface of the carrier plate 14 adjacent the cover plate 12 by the use of any known printing technique such as, for example, an offset printing technique, a gravure printing technique or a silk screen printing technique, at any desired location on that surface of the carrier plate 14. During the printing to form the security indicium 18, the printing ink should contain at least a material under any of the following categories of materials which have a property of absorbing, emitting or scattering light when irradiated by a coherent beam of a wavelength within the range of 150 to 5,000 nm, respectively. Of the various printing inks available for the purpose of the present invention, the silk screen printing ink or the gravure printing ink, whichever containing the material under any one of the following categories, is preferred in view of the excellent bondability available between the information recording medium, particularly the carrier plate 14 and the printed security indicium 18.

Category A: Material of a kind capable of absorbing a predetermined wavelength region, but being transparent to any other wavelength regions other than the predetermined wavelength region;

Category B: Material of a kind capable of, when irradiated by light of a predetermined wavelength, emitting a fluorescent light of a wavelength region different from the predetermined wavelength of the radiating light;

Category C: High light scattering material of a kind capable of, when irradiated by light of a predetermined wavelength, scattering light in a direction substantially parallel to and substantially counter to the direction of incidence of the radiating light; and Category D: Material which is mixed with laser oscillating ultramicroparticles or a combination of high light scattering microparticles and dyes and which is, when irradiated by light of a predetermined wavelength, capable of emitting light of a wavelength different from the predetermined wavelength of the radiating light in a direction substantially parallel to and substantially counter to the direction of incidence of the radiating light, or emitting natural light depending on increase of the radiation intensity or emitting a light beam based on a laser action.

The security indicium 18 so printed on the carrier plate 14 is completely covered by the next adjacent cover plate 12 so that nobody can make access thereto nor observe with naked eyes. In addition, if an attempt is made to delaminate the oblong plates 12 and 14 from each other, the security indicium 18 will be ruined in its entirety or in part to such an extent that the information represented by the security indicium 18 will be no longer be machine-readable.

Also, to further increase the security level, the printing ink is preferably of a color substantially the same as the color of at least the carrier plate 14 so that nobody would perceive the boundary between the printed security indicium 18 and the background color of the carrier plate 14 with his or her naked eyes. The transparent or white-colored printing ink is preferred since most of the currently available credit cards made of polyvinyl chloride resin is white-colored.

In describing the credit card 10, the security indicium 18 has been described and shown as employed in the form of the bar code such as shown in FIGS. 1A and 1B. However, the security indicium 18 may be in the form of one or more alphabetic letters or characters, a fingerprint or DNA information of the user or owner, or any other symbol or a combination thereof that may identify the user or owner of the information carrier medium and/or the origin of the information carrier medium, and may be chosen depending on the type of the information carrier medium and/or the purpose for which it is used. By way of example, the information represented by the security indicium 18 may include the owner's identification, an identification of the card issuing company, a bank identification and the date of expiration.

Separate from the security indicium 18, the credit card 10 may have a magnetic recording stripe on one of opposite surfaces of the credit card 10 in a manner well known to those skilled in the art and/or may be embossed. A hologram and/or a rainbow-patterned printing may also be provided on one or both surfaces of the credit card 10. Furthermore, the credit card 10 may have an IC chip embedded therein as is well known to those skilled in the art. In any event, the credit card 10 having the security indicium 18 concealed or embedded therein may have an outer appearance similar to that of any existing credit card.

Hereinafter, various embodiments of an optical card reader will be described. To read the security indicium 18 embedded in the credit card 10, an electro-optical card reader may be contemplated in which the credit card 10 is irradiated by a laser beam so that the laser beam having passed through the credit card 10 or the fluorescent light emitted as a result of radiation of the laser beam can be detected. The working system employed in this type of the electro-optical card reader, which ought to be kept in strict confidence, tends to be easily revealed once the electro-optical card reader is disassembled or at least inspected from outside with a casing removed. Considering that the use of a laser oscillator in the electro-optical card reader can readily be revealed, the laser beam that is employed in the practice of the present invention is preferred to be a near-infrared laser beam although not exclusively limited thereto.

Assuming, however, that the near-infrared laser beam is employed, the material under the category A listed hereinbefore should be of a kind capable of exhibiting an absorption characteristic in the near-infrared region; the material B listed hereinbefore should be of a kind capable of emitting the fluorescent light in the near-infrared region; and any of the materials under the categories C and D listed hereinbefore should similarly be of a kind capable of emitting light in the near-infrared region. A practical utility can also be found if the front overlay films 16a and 16b and the oblong plates 12 and 14 are made of the synthetic resin capable opaque to the visible rays of light, but transparent to the near-infrared light.

The foregoing consideration is applicable where the working system of the electro-optical card reader can easily be revealed as hereinbefore described. However, where the electro-optical card reader is assembled with a means incorporated to prevent any possible dismantling and/or reverse-engineering, the wavelength of the light used in the practice of the present invention may not be limited to the near-infrared region, may be in the visible or near-ultraviolet region.

Figure 3:
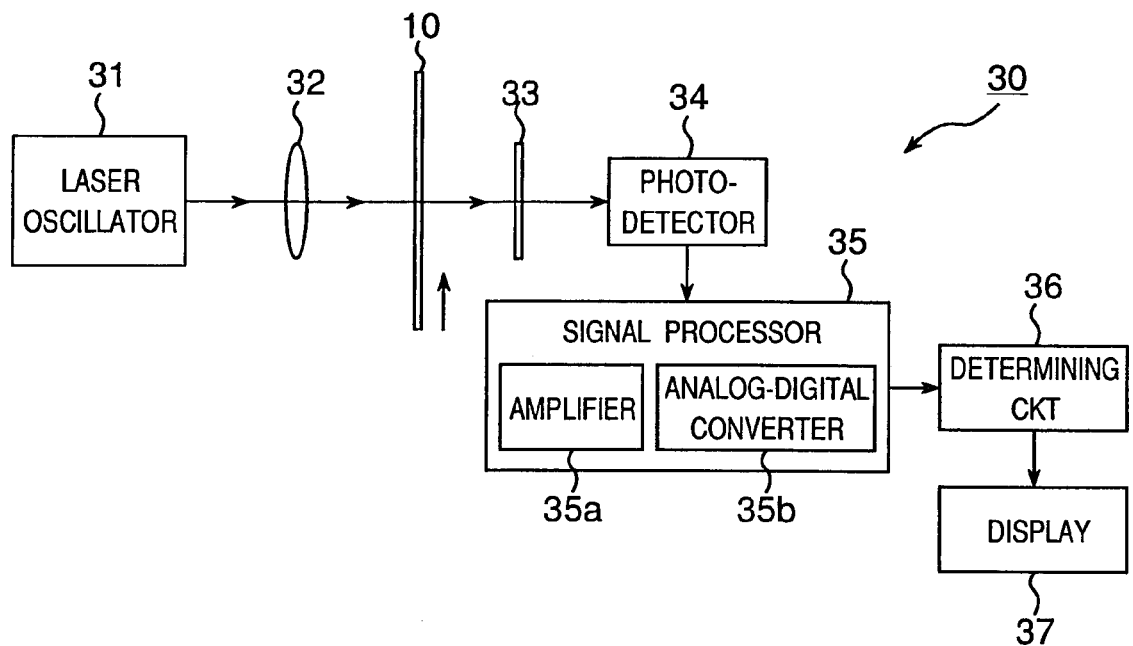
FIG. 3 is a block diagram showing a card reader according to a first preferred embodiment of the present invention.

Referring now to FIG. 3, there is shown a first preferred embodiment of the electro-optical card reader 30 according to the present invention. The electro-optical card reader 30 shown therein comprises a laser oscillator 31 for emitting a laser light of, for example, a near-infrared region which is subsequently shaped into a fine pencil of the laser light as it pass through an optical system 32 such as, for example, a condensing lens. The pencil of laser light emerging from the optical system 32 is utilized to illuminate the credit card 10. The laser beam having passed through the credit card 11 and, hence, carrying information represented by the security indicium 18 is received by a photo-detector 34 after having passed through an optical filter 33 operable to permit passage therethrough of only light of a predetermined wavelength.

The photo-detector 34 may be a photodiode, an avalanche photodiode or any other high sensitivity photo-detector. An output signal from the photo-detector 34 that is descriptive of the information represented by the security indicium 18 is supplied to a signal processor 35. This signal processor 35 includes an amplifier 35a for amplifying the signal from the photo-detector 34 and an analog-to-digital (A/D) converter 35b for converting the amplified signal into a digital information-wise signal. An output signal from the signal processor 35 is then supplied to a determining circuit 36 which includes a semiconductor memory (not shown) in which a reference signal corresponding to the information represented by the security indicium 18 is stored. Accordingly, the determining circuit 36 compares the output signal from the signal processor 35 with the reference signal stored in the built-in semiconductor memory to determine if the both match with each other. This determining circuit 36 is electrically connected with a display unit 37 and, accordingly, the result of comparison performed by the determining circuit 36 can be displayed through the display unit 37 to provide a visual indication.

It is to be noted that the determining circuit 36 may comprise a comparator in the context discussed above. However, considering that the credit card 10 embodying the present invention is of a nature that may be distributed in a huge number to different users with the security indicia 18 having correspondingly different data born therein, the determining circuit 36 may be a remote computer system supervised by, for example, the card issuing company, which system includes customer database. To this end, the signal processor 35 and the display unit 37 may be connected with the remote computer system of the card issuing company by means of, for example, a telephone network so that the output from the signal processor 35 can be supplied to the remote computer system and the result of verification performed by the remote computer system can be fed back to the display unit 37.

The electro-optical card reader 30 of the structure described above is so configured that the credit card 10 can be either manually or automatically moved in a direction perpendicular to the path of travel of the laser beam passing through the optical system 32 so that the security indicium 18 can be scanned in its entirety by the laser beam. The system of guiding the credit card 10 in this manner along a guide groove substantially delimited between the optical system 32 and the optical filter 33 is well known to those skilled in the art and, therefore, the details thereof are not reiterated for the sake of brevity.

Some of the component parts of the electro-optical card reader 30, that is, the laser oscillator 31, the optical system 32, the optical filter 33, the photo-detector 34 and the signal processor 35, together with or without the determining circuit 36 are preferably embedded in a molded block of, for example, a moldable plastics material, except for respective surfaces of the optical system 32 and the optical filter 33 which confront with each other and positioned on respective sides of the guide groove defining the path of movement of the credit card 10 are exposed to the outside through the guide groove.

Figure 4:
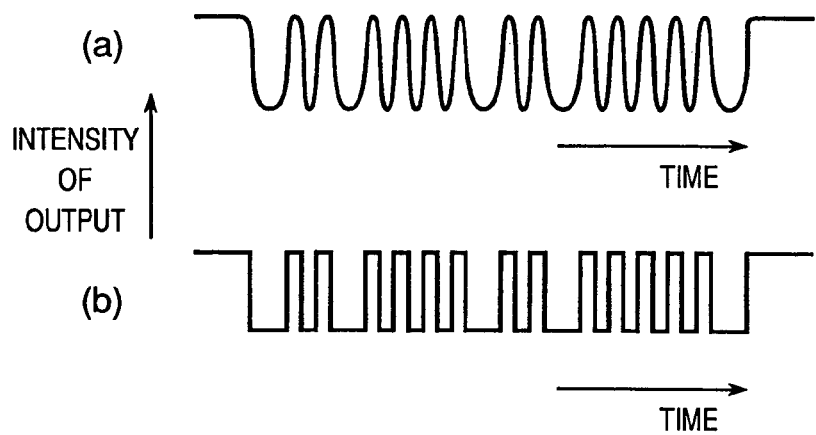
FIG. 4 is a chart showing waveforms of signals outputted respectively from a photo-detector and a signal processor both employed in the card reader shown in FIG. 3.

Referring to FIG. 4, a waveform (a) represents that of the output signal from the photo-detector 34 which is descriptive of the information represented by the security indicium 18. As hereinbefore described, the output signal from the photo-detector 34 is, after having been amplified by the amplifier 35a, converted by the A/D converter 35b into the digital signal, the waveform of which is shown by a waveform (b). The waveforms shown respectively by (a) and (b) in FIG. 4 is applicable where the security indicium 18 is printed by the use of the printing ink containing the material A listed hereinbefore. The printing ink containing the material under the category A is effective to absorb and intercept the laser beam when the security indicium 18 is illuminated thereby and, accordingly, where the security indicium 18 is in the form of the bar code comprised of an array of the black-colored bars, scanning of the black-colored bars results in a low level signal component as clearly shown in FIG. 4.

On the other hand, where the security indicium 18 is printed by the use of the printing ink containing any one of the materials under the categories B and D listed hereinbefore, the security indicium 18 when irradiated by the laser beam will emit a fluorescent light or an amplified natural light, respectively, with the wavelength different from that of the radiating laser beam and, therefore, the waveforms of the respective output signals from the photo-detector 34 and the A/D converter 35b would be reverse to those shown by (a) and (b) in FIG. 4.

Also, where the security indicium 18 is printed by the use of the printing ink containing the material under the category C listed hereinbefore, the laser beam having passed through the credit card 10 is a scattering light of a wavelength equal to that of the radiating laser beam and, therefore, the photo-detector 34 receives the scattering light. Accordingly, the waveforms of the respective output signals from the photo-detector 34 and the A/D converter 35b would be reverse to those shown by (a) and (b) in FIG. 4.

The output signal from the signal processor 35 is supplied to the determining circuit 36 for comparison with the stored reference signal as hereinbefore described, In the event that the output signal from the signal processor 35 is determined as matching with the stored reference signal, the credit card 10 so scanned by the electro-optical card reader 30 is verified as authentic. On the other hand, in the event that the output signal from the signal processor 235 is determined as not matching with the stored reference signal, the credit card so scanned is verified as forged. In either case, the result of determination is displayed by the display unit 37.

As hereinbefore described, the electro-optical card reader 30 is enclosed by and embedded in the moldable plastics material and, therefore, either dismantling or reverse-engineering of the electro-optical card reader 30 would be extremely difficult. In addition, the credit card 10 having the security indicium 18 according to the present invention can readily be manufactured by the use of any existing facilities and is therefore inexpensive to manufacture. This equally applies to the electro-optical card reader 30 that can be assembled using commercially available electric component parts.

Where the printing ink used to form the security indicium 18 contains the material under the category A listed hereinbefore such as in the foregoing embodiment of the present invention, the material under the category A absorbs light of the predetermined wavelength and, therefore, it is necessary for the radiating laser beam to pass through the credit card 10. However, where any one of the materials under the categories B to D is employed in the printing ink, detection of light emitted from the ink material is necessary and, therefore, the photo-detector must be positioned on the same side as the laser oscillator 31 to render the electro-optical card reader as a whole to be of a reflective system. This will now be described with particular reference to FIG. 5 which illustrates a second preferred embodiment of the present invention.

Figure 5:
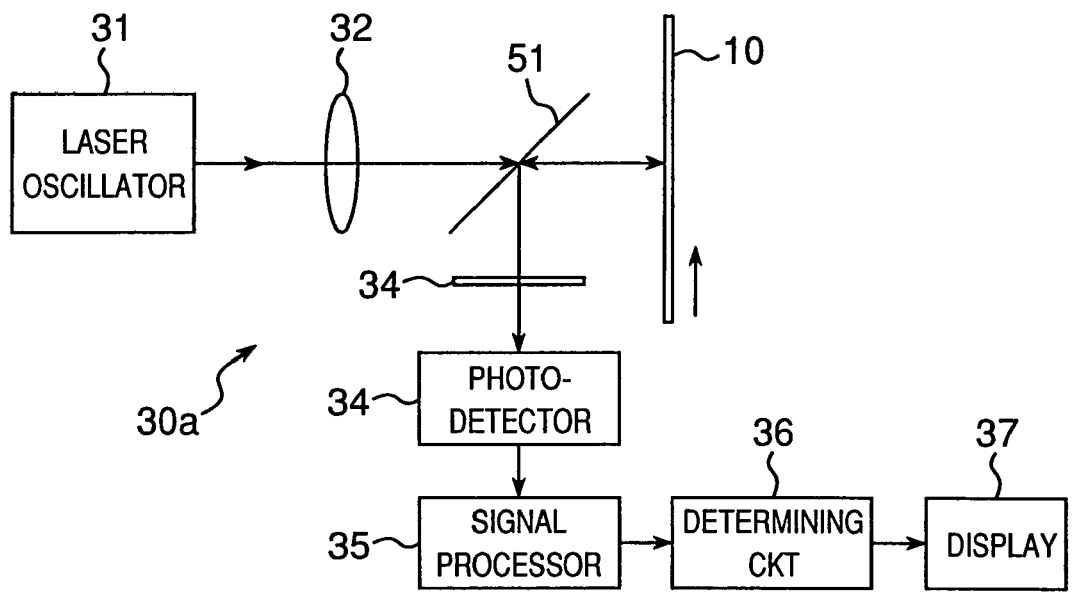
FIG. 5 is a block diagram showing the card reader according to a second preferred embodiment of the present invention.

The electro-optical card reader 30a shown in FIG. 5 differs from that shown in FIG. 3 in that the electro-optical card reader 30a makes use of a beam splitter 51 positioned between the optical system 32 and the optical filter 33 while the photo-detector 34 is positioned on the same side as the laser oscillator 31 to receive light emitted from the security indicium 18 via the beam splitter 51. More specifically, in the electro-optical card reader 30a, the laser beam emitted from the laser oscillator 31 passes through the optical system 32 and then through the beam splitter 51 to illuminate the credit card 10 and, on the other hand, the light emitted from the security indicium 18 as a result of irradiation by the laser beam travels towards the beam splitter 51 and is then deflected by the beam splitter 51 towards the photo-detector 34 by way of the optical filter 33.

The light emitted from the security indicium 18 so detected by the photo-detector 34 is processed in a manner similar to that in the foregoing embodiment.

The electro-optical card reader 30a is simple in structure since all of the component parts thereof can be positioned on one side of the credit card 10.

Figure 6:
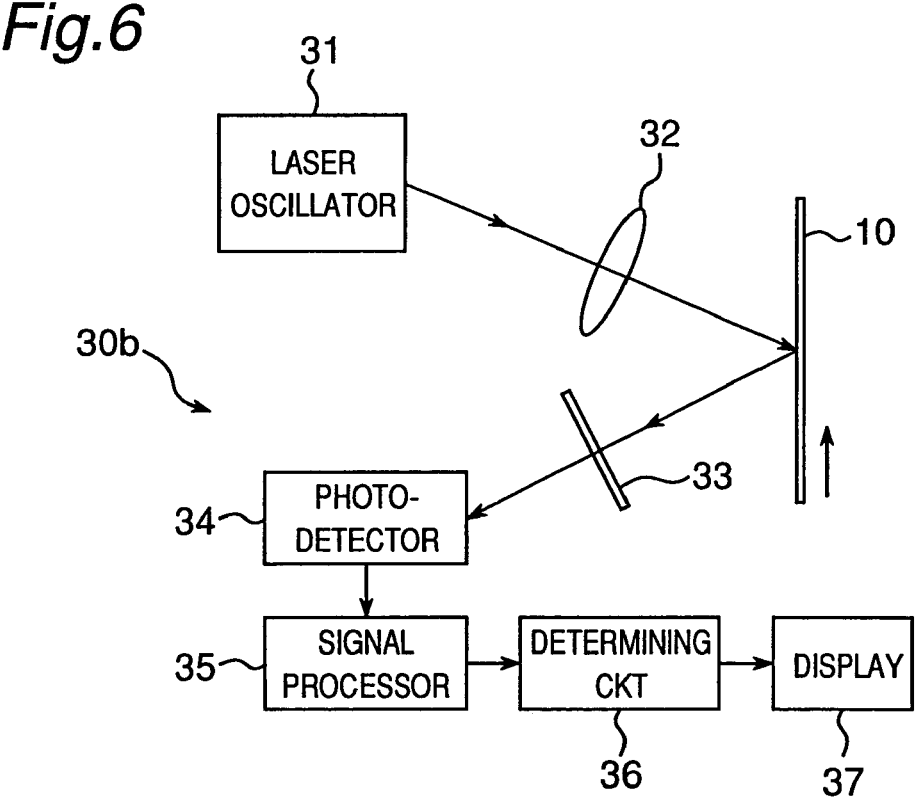
FIG. 6 is a block diagram showing the card reader according to a third preferred embodiment of the present invention.

While in the second embodiment of the present invention shown in FIG. 5, the beam splitter 51 has been employed, the electro-optical card reader will serve the purpose even without the beam splitter 51 as will now be described with reference to FIG. 6 showing the electro-optical card reader 30b according to a third embodiment of the present invention.

The electro-optical card reader 30b shown in FIG. 6 is substantially similar to the electro-optical card reader 30a shown in FIG. 5, except that the beam splitter employed in FIG. 5 is dispensed with and, instead, the laser oscillator 31 together with the optical system 32, and the photo-detector 34 together with the optical filter 33 are so arranged that the laser oscillator 31 can have an optical axis lying at an angle as close to the right angle as possible and, similarly, the photo-detector 34 can have an optical axis lying at an angle as close to the right angle as possible, but in a sense opposite to the optical axis of the laser oscillator 31. Thus, it will readily be seen that the laser beam emitted from the laser oscillator 31 impinges upon the credit card 10 at an angle of incidence as close to the right angle to the credit card 10 as possible and the light consequently emitted from the security indicium 18 in the credit card 10 emerges outwardly at an angle of emergence as close to the right angle to the credit card 10 as possible.

The electro-optical card reader 30b according to the embodiment shown in FIG. 6 is advantageous in that since no beam splitter is employed, it can be manufactured further simple in structure and less costly than that shown in FIG. 5.

In any one of the first to third embodiments of the present invention described hereinabove, the laser oscillator 31 and the photo-detector 34 need not be separated a substantial distance from each other, and the spacing between the laser oscillator 31 and the credit card 10 then held in the guide groove and the spacing between the credit card 10 then held in the guide groove and the photo-detector 34 may be small provided that the movement of the credit card 10 along the guide groove will not be disturbed. In such case, the optical system 32 may be dispensed with and the optical filter 33 may be fitted to a light receiving window of the photo-detector 34.

In practice, however, the guide groove along which the credit card 10 is moved so that it can be scanned by the laser beam may be delimited by a pair of transparent guide plates or rails that are spaced from each other a distance corresponding to the thickness of the credit card 10 with an output end of the laser oscillator 31 held in contact with one of the transparent guide plates or rails. In particular, in the case of the electro-optical card reader 30 according to the first embodiment, the light-receiving window of the photo-detector 34 has to be held in contact with the other of the transparent guide plates or rails in alignment with the output end of the laser oscillator, but in the case of any one of the electro-optical card readers 30*a* and 30*b* according to the second and third embodiments, respectively, the output end of the laser oscillator 31 and the light receiving window of the photo-detector 34 have to be held in contact with one of the transparent guide plates or rails. By so doing, the electro-optical card reader can advantageously be assembled in a compact size.

In describing any one of the first to third embodiments of the present invention, the security indicium 18 has been described as read in one dimension. However, the security indicium 18 may be read in two dimensions. For example, where the bar code forming the security indicium 18 in FIG. 1 is desired to be read not only in a direction parallel to the array of the black-colored bars, but also in a direction conforming to the lengthwise direction of each bar, the laser beam emitted from the laser oscillator 31 in the electro-optical card reader 30 shown in FIG. 1 has to be enlarged by the use of the optical system 32 to provide a parallel beam for illumination of the credit card 10 and on the other hand, a high sensitivity two-dimensional image analyzing system utilizing a charge-coupled device (CCD) has to be used to analyze the absorption pattern or the light emitting pattern of the security indicium 18.

Also, while in any one of the first to third embodiments of the present invention, the credit card 10 has been moved along the guide groove so that the credit card 10 can be scanned by the laser beam. However, in a broad aspect of the present invention, arrangement may be made to allow the laser beam to sweep while the credit card 10 is fixed in position. In other words, the relative movement between the laser beam and the credit card 10 is sufficient. In practice, however, where the laser beam is used to sweep the credit card 10, the photo-detector may comprise a CCD line sensor having a plurality of photocells arranged in an array conforming to the direction in which the laser beam is swept. Alternatively, if a cylindrical lens is used to enlarge the incoming laser beam in one dimension in one direction, in combination with the CCD line sensor for the photo-detector 34, the security indicium 18 in the credit card 10 can readily be read out with no need to cause the laser beam to sweep.

In the practice of the present invention, the credit card 10 or any other information carrier medium may comprise one or more additional security indicia such as, for example, markings and/or symbols, other than the security indicium 18 referred to hereinbefore. In such case, the pencil of laser light emitted from the laser oscillator and emerging outwardly through the optical system should have a diameter sufficient to encompass both of the security indicium 18 and the additional security indicia, in combination with the use of a CCD area sensor for the photo-detector. This arrangement makes it possible to read all of the security indicium in the credit card 10 without the credit card 10 being moved relative to the incoming laser beam.

A fourth preferred embodiment of the present invention will now be described. In order to effectively and sufficiently prevent any possible forgery of the credit card to thereby further increase the security level, a plurality of light wavelengths are employed in the fourth embodiment. For this purpose, first and second different materials under the category A each capable of absorbing the light of a respective predetermined wavelength λ1 or λ2, but passing therethrough the light of a wavelength other than the predetermined wavelength are employed for the security indicium 18. The predetermined wavelength λ1 which the first material can absorb and the predetermined wavelength λ2 which the second material can absorb are different from each other.

Figure 7:
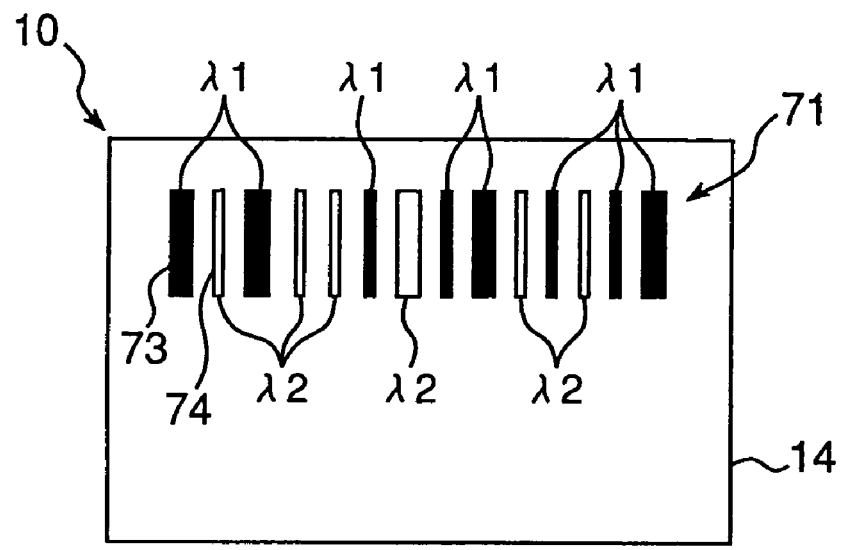
FIG. 7 is a schematic front elevational view of the credit card that can be employed with the card reader according to a fourth preferred embodiment of the present invention.

FIG. 7 illustrates the carrier plate 14 having the security indicium 71 printed thereon in the form of a bar code comprised of white-colored and black-colored bars 74 and 73. It is to be noted that the bars 73 and 74 forming the bar code may not be always physically black and white in color, respectively, but are shown white- and black-colored in FIG. 7 only for the purpose of visual representation. The credit card including the carrier plate 14 shown in FIG. 7 is particularly suited for use in connection with the fourth embodiment of the present invention and, therefore, the nature of the bar code forming the security indicium 18 will now be described in detail.

The black-colored bars 73 are prepared from the printing ink containing the first material and can therefore absorb the light of the predetermined wavelength λ1 while the white-colored bars 74 are prepared from the printing ink containing the second material and can therefore absorb the light of the predetermined wavelength λ2.

The electro-optical card reader operable with the credit card 10 having the security indicium 71 shown in FIG. 7 in accordance with the fourth embodiment of the present invention is shown in FIG. 9. The electro-optical card reader now identified by 30*c* in FIG. 9 comprises first and second laser oscillators 31*a* and 31*b* for emitting respective laser beams of the wavelengths λ1 and λ2, and first and second optical systems 32*a* and 32*b* each comprised of, for example, a condensing lens for converging the associated laser beams λ1 and λ2 at the security indicium 71 in the credit card 10 to illuminate the latter. Laser light having passed through the credit card 11 are, after having been passed through first and second optical filters 33*a* and 33*b*, received by first and second photo-detectors 34*a* and 34*b*, respectively. Respective laser beams filtered by the optical filters 34*a* and 34*b* are sensed by first and second photo-detectors 34*a* and 34*b*.

The first photo-detector 34*a* is used to detect absorption of the wavelength λ1 whereas the second photo-detector 34*b* is used to detect absorption of the wavelength λ2. An output from the first photo-detector 34*a* is supplied directly to the signal processor 35 whereas an output from the second photo-detector 34*b* is supplied to the signal processor 35 through an output controller 91. The output controller 91 may be comprised of, for example, a programmed delay circuit and is operable to supply the output signal from the second photo-detector 34*b* to the signal processor 35*a* predetermined delay time after the output signal from the first photo-detector 34*a* has been supplied to the signal processor 35. The signal processor 35 is in turn connected with the determining circuit 36*a* which is in turn connected with the display unit 37 or which may be connected with the remote computer system through the telephone network as discussed previously. However, it is to be noted that in the embodiment shown in FIG. 9, the determining circuit 36a includes a semiconductor memory (not shown) in which a λ1 absorption signal descriptive of the information represented by a group of the black-colored bars 73 and a λ2 absorption signal descriptive of the information represented by a group of the white-colored bars 74 are stored as first and second reference signals, respectively.

As is the case with any one of the previously described embodiments of the present invention, the credit card 10 is moved along the guide groove to allow the security indicium 71 to be scanned by the respective laser beams from the laser oscillators 31a and 31b. Accordingly, the first and second photo-detectors 34a and 34b detect absorption of the respective wavelengths λ1 and λ2. The outputs signals from the first and second photo-detectors 34a and 34b which are descriptive of the λ1 and λ2 absorption, respectively, are amplified and converted in the signal processor 35 into associated digital signals in a manner similar to that described previously, but in a manner delayed with respect to each other.

Figure 8:
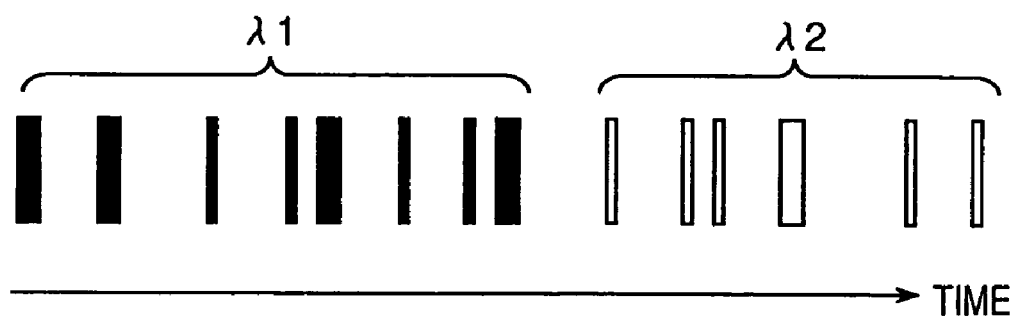
FIG. 8 is a chart used to explain the operation of the card reader according to the fourth preferred embodiment of the present invention.

FIG. 8 illustrates schematically the waveform of a digital output signal from the signal processor 35. Since the output from the second photo-detector 34b associated with detection of the information represented by the group of the white-colored bars 74 is delayed by the output controller 91 relative to the output from the first photo-detector 34a associated with detection of the information represented by the group of the black-colored bars 73, the digital output signal from the signal processor 35 includes an array of a first digital signal component representative of the λ1 absorption signal and a second digital signal component representative of the λ2 absorption signal that is separated from the first digital signal component a length of time corresponding to the predetermined delay time.

The determining circuit 36a therefore compares the first and second digital signal components, sequentially outputted from the signal processor 35, with the respective first and second reference signals stored therein, to thereby verify the authenticity of the credit card 10. In other words, only when the first digital signal component matches with the first reference signal and, at the same time, the second digital signal component matches with the second reference signal, the determining circuit 36a verifies the credit card as authentic, but otherwise verifies as forged. The result of determination by the determining circuit 36a is displayed by the display unit 37.

In describing the fourth embodiment of the present invention with particular reference to FIG. 9, the output controller 91 has been described as operable to delay the output signal from the second photo-detector 34b relative to that from the first photo-detector 34a. However, the present invention may not be limited thereto, and the output controller 91 may be connected between the first photo-detector 34a and the signal processor 35 to delay the output signal from the first photo-detector 34a relative to that from the second photo-detector 34b.

The delay time set in the output controller 91, although having been described as a value sufficient to allow the respective output signals from the first and second photo-detectors 34a and 34b to be received by the signal processor 35 in a manner sufficiently separated from each other, may be a value sufficient to allow the respective output signals from the first and second photo-detectors 34a and 34b to be received by the signal processor 35 in a manner partly overlapping with each other.

In addition, where reading of either the group of the black-colored bars 73 or the group of the white-colored bars 74 serves the purpose, the corresponding circuit system including one of the laser oscillators 31a and 31b and the associated photo-detector 34a or 34b may be held inoperative. By way of example, if the output controller 91 has a trigger switch operable to deactivate only the output controller 91 itself or the circuit system including the second oscillator 31b, the second photo-detector 34b and the output controller 91, reading of only the group of the black-colored bars 73 of the security indicium 71 is possible.

In any event, the electro-optical card reader 30c according to the fourth embodiment of the present invention is particularly advantageous in that since the security indicium 71 is made up of different security features containing the first and second different materials, the credit card 10 is extremely hard to be forged.

In the practice of the fourth embodiment of the present invention, although reference has been made to the use of the two different materials under the category A to form the security indicium 71, a similar description can equally apply even when two materials under any of the categories B to D are employed to eventually form the security indicium 71. By way of example, where the first and second materials under the category B are employed, one of the following possibilities is available:

1) The first and second materials under the category B should be of a nature capable of emitting respective fluorescent light of wavelengths λ1 and λ2 when irradiated by the laser beams of the same wavelength; or
2) The first and second materials under the category B should be of a nature capable of emitting respective fluorescent light of wavelengths λ1 and λ2 when irradiated by the laser beams of different wavelengths.

However, where the security indicium 71 is prepared by the use of the printing inks containing the respective materials of the nature discussed under item (1) above, instead of the use of the two laser oscillators 31a and 31b capable of emitting the respective laser beams of the same wavelength, the use of a single laser oscillator may be contemplated in combination with a beam splitter capable of dividing the incoming laser beam into two components one associated with the first photo-detector 34a and the other with the second photo-detector 34b.

Where the first and second materials under the category C each capable of scattering the incoming light are used to eventually form the security indicium 71, the light scattered by those materials as a result of laser beam irradiation should have respective wavelengths λ1 and λ2.

Where the first and second materials under the category D to eventually form the security indicium 71, a description similar to that discussed in connection with the use of the first and second materials under the category B equally applies.

Particularly where the security indicium 71 is prepared by the use of the printing inks containing the materials under any one of the categories (B) to (D), the first and second photo-detectors 34a and 34b although shown in FIG. 9 as positioned on one side of the credit card 10 in the guide groove opposite to the associated laser oscillators 31a and 31b, may be positioned on the same side as the associated laser oscillators 31a and 31b in a manner substantially similar to that shown in FIGS. 5 and 6.

In addition, although the security indicium 71 has been described as formed by the use of the printing inks containing the respective materials under any one of the categories A to D, it should be noted that the printing inks may contain the first material under one of the categories A to D and the second material under another one of the categories A to D which is different in category from the first material. In other words, a combination of two or more materials under the different categories is possible to eventually form the security indicium 71.

In any one of the foregoing embodiments of the present invention, the photo-detection system employed is based on a direct detecting method in which the photo-detector (or photo-detectors) is (are) employed. However, to increase the detection sensitivity, a photo-heterodyne detection method is particularly advantageous. Where the photo-heterodyne detection method is to be adopted, the output light from the laser oscillator have to be divided into a signal light and a local oscillated light (reference light) which are, after having passed through the credit card, to be overlapped with each other before they are detected by the photo-detector, so that a signal of an intermediate frequency can be extracted.

Also, for detection of the absorption pattern or the light emitting pattern exhibited by the bar code, characters, symbol array and/or figures, the photo-heterodyne method utilizing a two-dimensional photo-detector may be equally employed.

The laser oscillator that can be employed in the practice of the present invention may be of any known construction. For example, the laser oscillator may comprise a semiconductor laser such as, for example, AlGaAs, AlGaInP, GaInP, InGaAsP, InGa, PbCdS, PbSnSe, PnSnTe, PbSSe, ZnCdSe or ZnSSe; an ultraviolet laser such as, for example, a rare gas halide excimer laser including ArF, KrF or XeCl, a rare gas excimer laser including Xe2, a nitrogen N2 laser, or Fe laser; a solid-state laser such as, for example, Ce:LiSAF, Cr:BeAl2O4, Cr:LiSAF, Er:YAG, Er:YLF, Er:glass laser, Ho:YAG, Nd:YAG, Nd:YLF, Nd:YVO4, Nd:glass laser, Ruby, Ti:Al2O3, Tm:YAG, Yb:YAG or Ho:YLF; a wavelength-variable laser such as, for example, alexandrite or OPO; and any other laser such as, for example, CO, He—Cd, He—Ne, HF, or ion laser including Yb-doped fiber and algon. A super-luminescent light emitting diode or a light emitting diode may also be employed in combination with the direct detecting method.

Although the present invention has been described in connection with the preferred embodiments thereof with reference to the accompanying drawings, it is to be noted that various changes and modifications are apparent to those skilled in the art. For example, although the information carrier medium or the credit card has been described as made of the plastics material, it may be made of a laminate of papers.

Also, the information carrier medium that can be employed in the practice of the present invention may be, other than the credit card, a security document, a certificate, a gift card, or any other medium which would, if forged, result in damage.

Accordingly, such changes and modifications are to be understood as included within the scope of the present invention as defined by the appended claims, unless they depart therefrom.

What is claimed is:

1. An information carrier medium which comprises:
at least first and second sheet members each having first and second surfaces opposite to each other, said first and second sheet members being laminated together with the first surface of the first sheet member bonded to the first surface of the second sheet member; and
a security indicium formed on at least one of the first surfaces of the respective first and second sheet members, said security indicium comprising a pattern of a plurality of regions with various sizes, each of the regions in said security indicium being made of a first inking material and a second inking material which are disposed separately from each other,
the first inking material for giving out light in response to a first wavelength of incident light, and the second inking material for giving out light in response to a second wavelength of incident light,
the light given out by the first inking material having a first wavelength different from a second wavelength, the light given out by the second inking material having the second wavelength and not having the first wavelength is different from the first wavelength,
the light given out by the second inking material not having the first wavelength and having the second wavelength, the first and second sheet members being opaque to visible light and transparent to the lights of the first and second wavelengths.

2. The information carrier medium as claimed in claim 1, wherein one of the inking materials is capable of transmitting the light of the first wavelength, and the other of the inking materials is capable of transmitting the light of the second wavelength and absorbing the light of the first wavelength when irradiated by the incident light.

3. The information carrier medium as claimed in claim 1, wherein one of the inking materials is capable of emitting light of the first wavelength, and the other of the inking materials is capable of emitting the light of the second wavelength when irradiated by the incident light.

4. The information carrier medium as claimed in claim 1, wherein one of the inking materials is capable of scattering the light of the first wavelength, and the other of the inking materials is capable of scattering the light of the second wavelength when irradiated by the incident light.

5. The information carrier medium as claimed in claim 1, wherein one of the inking materials is capable of transmitting the light of the first wavelength and absorbing a light of the second wavelength, and the other of the inking materials is capable of emitting the light of the second wavelength when irradiated by the incident light.

6. The information carrier medium as claimed in claim 1, wherein the security indicium formed on such one of the first surfaces of the respective first and second sheet members is invisible to naked eyes.

7. The information carrier medium as claimed in claim 6, wherein said first and second sheet members are made of an opaque synthetic resin transparent to a light different from visible light.

8. The information carrier medium as claimed in claim 1, wherein said first and second sheet members are made of an opaque synthetic resin containing a polyvinyl chloride copolymer as a principal component, and an overlay film is made of a hard polyvinyl chloride.

9. The information carrier medium as claimed in claim 1, wherein said security indicium comprises a bar code made of the two inking materials.

10. The information carrier medium as claimed in claim 1, wherein said security indicium comprises characters made of the two inking materials.

11. The information carrier medium as claimed in claim 1, further comprising an overlay film integrated with an outer surface of said at least first and second sheet members laminated together, the overlay film having a magnetic strip layered on an outer surface thereof.

12. An electro-optical reader for reading an information carrier medium comprising at least first and second sheet members each having first and second surfaces opposite to each other, said first and second sheet members being laminated together with the first surface of the first sheet member bonded to the first surface of the second sheet member; and a security indicium formed on at least one of the first surfaces of the respective first and second sheet members, said security indicium comprising a pattern of a plurality of regions with various sizes, each of the regions in said security indicium being made of a first inking material and a second inking material which are disposed separately from each other, the first inking material for giving out light in response to a first wavelength of incident light, and the second inking material for giving out light in response to a second wavelength of incident light, the light given out by the first inking material having a first wavelength different from a second wavelength, the light given out by the second inking material not having the first wavelength and having the second wavelength, the first and second sheet members being opaque to visible light and transparent to the lights of the first and second wavelengths, said reader comprising:

a first source for projecting the light of the first wavelength and a second source projecting light of the second wavelength towards the information carrier medium to illuminate a portion of the information carrier medium in register with the security indicium;

a first detector and a second detector for detecting rays of light obtained from that the portion of the information carrier medium;

a signal processor which receives signals from said detectors and provides an output signal synthesized by compensating a relative distance between the lights of the first wavelength and the second wavelength projected by said first source and said second source;

a storage device which stores a reference signal for the first and second wavelengths in correspondence to the security indicium; and a comparator connected with the signal processor for comparing the output signal from said signal processor with the reference signal to verify an authenticity of the information carrier medium.

13. The electro-optical reader as claimed in claim 12, further comprising a mechanism for guiding the information carrier medium relative to the lights projected by said first and second sources, wherein said detector comprises two photo-detectors for detecting the rays of light of the first and second wavelengths, respectively, and said signal processor comprises a delay circuit for compensating a delay of signals due to a relative distance between the two photo-detectors.

14. The electro-optical reader as claimed in claim 12, wherein said detector comprises a charge-coupled device line sensor.

15. The electro-optical reader as claimed in claim 12, wherein said detector comprises a charge-coupled device area sensor.

16. The electro-optical reader as claimed in claim 12, wherein the lights projected from the first source and the second source are substantially parallel to each other.

17. The electro-optical reader as claimed in claim 12, wherein a portion of the light projected from the first source that is reflected by the first inking material is detected by the first detector, and a portion of the light projected from the second source that is reflected by the second inking material is detected by the second detector.

18. A method of verifying authenticity of an information carrier medium comprising at least first and second sheet members each having first and second surfaces opposite to each other, said first and second sheet members being laminated together with the first surface of the first sheet member bonded to the first surface of the second sheet member; and a security indicium formed on at least one of the first surfaces of the respective first and second sheet members, said security indicium comprising a pattern of a plurality of regions with various sizes each of the regions in said security indicium being made of a first inking material and a second inking material which are disposed separately from each other, the first inking material for giving out light in response to a first wavelength of incident light and the second inking material for giving out light in response to a second wavelength of incident light, the light given out by the first inking material having a first wavelength different from a second wavelength, the light given out by the second inking material not having the first wavelength and having the second wavelength, the first and second sheet members being opaque to visible light and transparent to the lights of the first and second wavelengths, said method comprising the steps of:

providing a first source for projecting the incident light of the first wavelength and providing a second source for projecting the incident light of the second wavelength;

projecting incident lights from the first source and the second source towards the information carrier medium to illuminate a portion of the information carrier medium in register with the security indicium;

detecting rays of lights obtained from that portion of the information carrier medium;

synthesizing the detected signals to provide an output signal by compensating relative distance between the lights projected by the first and the second source;

comparing outputs from the photo-detector with a reference signal stored beforehand for the first and second wavelengths in correspondence to the security indicium; and in the event that the output from the photo-detector matches with the reference signal, determining that the information carrier medium is authentic.

19. The method of verifying authenticity of an information carrier medium as claimed in claim 18, further comprising the step of projecting the light rays from the first source and the second source in a direction substantially parallel to each other.

20. The method of verifying authenticity of an information carrier medium as claimed in claim 18, further comprising the steps of detecting a portion of the light projected from the first source and reflected by the first inking material by a first photo detector, and detecting a portion of the light projected from the second source and reflected by the second inking material by a second photo detector.

* * * * *